US 7,521,498 B2

(12) United States Patent
Stevens et al.

(10) Patent No.: US 7,521,498 B2
(45) Date of Patent: Apr. 21, 2009

(54) CRESOL-FREE OR LOW-CRESOL WIRE ENAMELS

(75) Inventors: Guenter Stevens, Kempen (DE); Giovanna Biondi, Ascoli Piceno (IT); Piotr Penczek, Warszawa (PL); Elzbieta Wardzinska, Grodzisk Mazowiecki (PL)

(73) Assignee: ALTANA Electrical Insulation GmbH (DE)

( * ) Notice: Subject to any disclaimer, the term of this patent is extended or adjusted under 35 U.S.C. 154(b) by 465 days.

(21) Appl. No.: 11/137,709

(22) Filed: May 25, 2005

(65) Prior Publication Data

US 2006/0036009 A1    Feb. 16, 2006

Related U.S. Application Data

(63) Continuation of application No. 10/922,810, filed on Aug. 19, 2004, now abandoned, which is a continuation of application No. PCT/EP03/01525, filed on Feb. 15, 2003.

(30) Foreign Application Priority Data

Feb. 19, 2002  (DE) ................. 102 06 781

(51) Int. Cl.
*C08K 5/101* (2006.01)
*C08K 5/06* (2006.01)

(52) U.S. Cl. ................. 524/315; 524/375; 524/384

(58) Field of Classification Search ................. 524/315, 524/384

See application file for complete search history.

(56) References Cited

U.S. PATENT DOCUMENTS

| 4,186,122 A | 1/1980 | Okada et al. |
| 5,032,488 A * | 7/1991 | Finter ................. 430/270.1 |
| 5,718,992 A * | 2/1998 | Sato et al. ................. 430/7 |

FOREIGN PATENT DOCUMENTS

| DE | 1058666 B | 6/1959 |
| DE | 2739717 A | 3/1978 |
| DE | 4133161 A | 4/1993 |
| FR | 2650829 A | 2/1991 |

OTHER PUBLICATIONS

"International Search Report for PCT/EP03/01525", (Jun. 5, 2003).

* cited by examiner

*Primary Examiner*—Tae H Yoon
(74) *Attorney, Agent, or Firm*—Schwegman, Lundberg & Woessner, P.A.

(57) ABSTRACT

The invention relates to wire enamels based on polyester, polyesterimide, polyesteramidoimide and/or polyurethane resins, which contain one or more of said resins as binders, and organic solvents and optionally diluents. At least 50% by weight of the solvent or of the solvent/diluent mixture consists of a monocyclic aromatic alkyl-carboxylic acid ester or isophorone or of a mixture of methyl benzoate and isophorone.

16 Claims, 1 Drawing Sheet

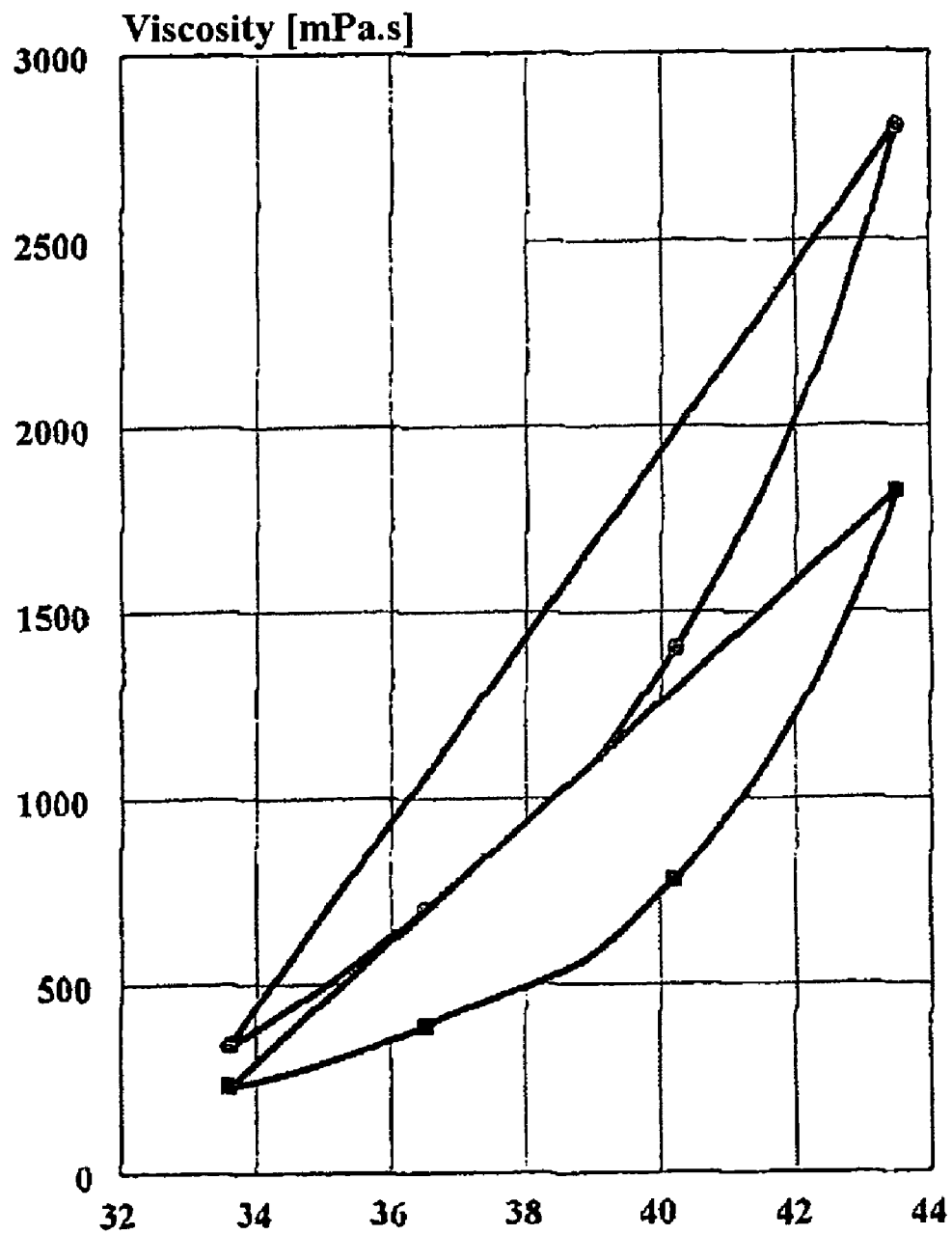
§ Cresol-free polyesterimide enamel
§ Conventional cresol-containing polyesterimide enamel

CRESOL-FREE OR LOW-CRESOL WIRE ENAMELS

RELATED APPLICATIONS

This application is a continuation under 37 C.F.R. 1.53(b) of U.S. patent application Ser. No. 10/922,810 filed Aug. 19, 2004, now abandoned which is a continuation under 35 U.S.C. 111(a) of International Application No. PCT/EP03/01525 filed Feb. 15, 2003 and published in German as WO 03/070845A1 on Aug. 28, 2003, which claims priority under 35 U.S.C. 119 to German Application No. 102 06 781.3 filed Feb. 19, 2002, which applications and publication are incorporated herein by reference and made a part hereof.

FIELD OF THE INVENTION

The present invention relates to wire enamels based on polyester, polyesterimide, polyamidoimide and/or polyurethane resins, which contain one or more of said resins as binders and organic solvents and optionally diluents. The invention also relates to processes for the preparation of these wire enamels.

BACKGROUND OF THE INVENTION

In industry, polyester and polyesterimide wire enamels have been used for many years. The known wire enamels usually contain solvent mixtures comprising phenol, the homologs thereof, such as, for example, cresols and xylenols, and aromatic hydrocarbons.

Solvents, such as, for example, cresol, are used in the preparation of the wire enamels by using them for dissolving the separately prepared resins. They can also be used as a reaction medium, in particular in the synthesis of polyesters and polyesterimides. Furthermore, they can be used as an auxiliary component in the last stage of the preparation of polyester and polyesterimide resins from dicarboxylic acids or the dimethyl esters thereof, glycols, polyhydric alcohols, such as tris(2-hydroxyethyl)isocyanurate and—in the case of the polyesterimide resins—also from trimellitic anhydride, diamines and optionally bisphenols by esterification, transesterification and, in the case of polyesterimide resins, by imidation for reducing the viscosity of the reaction mixture and for accelerating the distillation of the volatile reaction products.

Cresols and other phenolic solvents, such as xylenols and trimethylphenols, such as, for example, mesitol, are predominantly used as auxiliary components in the last stage of the polyester and polyesterimide preparation.

Mixtures of solvents and diluents are usually used in the polyester and polyesterimide enamels. While solvents are suitable and necessary for completely dissolving the wire enamels, the diluents do not have these dissolution properties.

These diluents are, however, suitable for diluting a resin solution which is already present and provides advantageous viscosities of the resin solutions. Diluents are added for various reasons; firstly, the aromatic hydrocarbons usually used are substantially more economical than the special solvents, such as cresols, phenol or xylenols. Secondly, the solvent used evaporates relatively rapidly during the continuous application of the wire enamels. To ensure uniform evaporation behavior during baking, attempts are made to achieve as harmonious a course as possible of the evaporation behavior of the steadily changing azeotrope. Abrupt changes often cause surface defects in the cured enamel film.

Typically, diluents used are mixtures of aromatic hydrocarbons, such as Solvesso and solvent naphtha.

Efforts have long been made to avoid the use of cresols and other phenols in wire enamels. This is because, on the one hand, to the odor annoyance caused by said solvent and its harmful effect on health. In particular, these solvents and their pyrolysis products are permitted to be present only in very small amounts in the waste gases of the baking furnaces, because of the environmental protection provisions. In addition, wastewaters containing harmful phenolic compounds can be formed, under certain circumstances, during the preparation of the wire enamels.

DE-A-41 33 161 discloses the use of high-boiling monoalcohols, such as, for example, benzyl alcohol or methyldiglycol, alkylene glycol acetates, alkylene glycol ether acetates, esters and ketones, as solvents. A necessary but disadvantageous requirement of the DE-A-41 33 161 disclosure is that the structure of the polyester or polyesterimide resins must be changed to achieve the suitable mechanical properties of the enamel coats and wires. Solvent and diluent mixtures which are free of the phenolic substances are furthermore known. These mixtures are multicomponent systems which contain cyclohexanone, cyclohexanol, solvent naphtha, benzyl alcohol and propylene carbonate (Wardzinska E. et al., XXII FATIPEC-Congr., Budapest, 1994, Vol. 2, page 34).

The disadvantage of these systems is that the surfaces of the enameled (coated) wires are uneven, i.e. have an orange peel structure.

There exists a need for wire enamels which contain nontoxic, environmentally friendly high-boiling solvents which have little odor, and methods to formulate these wire enamels.

BRIEF DESCRIPTION OF THE DRAWING

Embodiments of the invention may be best understood by referring to the following description and accompanying drawing which illustrate such embodiments.

FIG. 1 illustrates the viscosity/solids content ratio of cresol-free and conventional cresol-containing polyesterimide wire enamels in comparison.

DETAILED DESCRIPTION

Surprisingly, it was found that wire enamels can be prepared by using monocyclic aromatic alkyl-carboxylic acid esters and isophorone as solvent of the wire enamels under discussion here. Resin solutions comprising these solvents or diluents have advantageous properties. Thus, the invention provides improved mechanical properties of the enameled (coated) wires using these enamels, such as, for example, the flexibility according to DIN EN 60851-3. In addition, the reduced viscosity of the enamel solutions when compared to that of conventional wire enamels should be mentioned. A comparison of these viscosities is illustrated in FIG. 1. Surprisingly, these advantages are not disclosed in patents to date.

The invention therefore relates to wire enamels based on polyester, polyesterimide, polyamidoimide and/or polyurethane resins, which contain one or more of said resins as binders as well as organic solvents and optionally diluents and which are characterized in that at least 50% by weight of the solvent or of the solvent/diluent mixture consists of a monocyclic aromatic alkyl-carboxylic acid ester of the general formula:

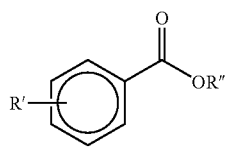

in which R' is H, —$C_nH_{2n+1}$ and n is 1 to 3 in the m- or p-position, preferably H, and in which R" is —$C_xH_{2x+1}$ with x is 1 to 10, preferably x is 1 to 3, particularly preferably x is 1, or a cycloaliphatic radical of the general formula —$C_yH_{2y-1}$ with y is 5 to 10, preferably y is 5-7, particularly preferably y is 6, or isophorone or a mixture of a monocyclic aromatic alkyl-carboxylic acid ester and isophorone.

Advantageously, the wire enamels contain, as a further solvent, 2-phenoxyethanol in an amount of 10 to 50% by weight, based on the total proportion of solvents and diluents.

Advantageously, the solvent or the solvent/diluent mixture of the wire enamels according to the invention comprise 80-100% by weight of methyl benzoate and/or isophorone.

It is desirable to use a monocyclic aromatic alkyl-carboxylic acid ester and/or isophorone as the only solvent, and, according to the invention, they at least form the main component of the solvent or of the solvent/diluent mixture.

Even if, for technical or economical reasons, it is expedient in some cases concomitantly to use the solvents or diluents employed in the prior art, a substantial reduction in the undesired solvents is nevertheless achieved in any case by the present invention.

Another class of wire enamels comprises the polyamidoimides and polyurethanes. Polyamidoimides and polyurethanes are soluble only in strongly polar solvents or in combination with the solvents according to the invention. In the prior art, the synthesis of these polymers by the known processes is therefore carried out in strongly polar solvents, such as N-methylpyrrolidone, N,N-dimethylformamide and/or N,N-dimethylacetamide. The high dissolving power of isophorone which has been found is therefore surprising. Another advantage of the solvents to be used according to the invention is that, under the conditions of the polyamidoimide and polyurethane synthesis, they do not react with the reactants, such as, in particular, the diisocyanates, trimellitic anhydride and polyesteralcohols.

According to the invention, both methyl benzoate and isophorone are preferably used as the main component of the solvent/diluent mixtures for polyester and polyesterimide wire enamels. Thanks to the high dissolving power of these two solvents, considerable amounts of aromatic hydrocarbons, such as solvent naphtha, can be introduced into these mixtures if this is desired. The aromatic hydrocarbons have a high heat of combustion so that the solvent mixtures, too, have the high heat of combustion. This is advantageous for heating the combustion catalyst and the solvent vapors to be incinerated.

In addition to methyl benzoate or isophorone and solvent naphtha, the polyester and polyesterimide wire enamels according to the invention contain cyclohexanone, dimethyl esters of aliphatic dicarboxylic acids, such as, for example, dimethyl succinate, dimethyl glutarate and dimethyl adipate, glycol esters and glycol ether esters. Other solvents or diluents known per se may also be contained, but phenols and nitrogen-containing proton-free amide solvents should not be added. According to the invention, a high proportion of monocyclic aromatic alkyl-carboxylic acid esters and isophorone is of decisive importance.

The solids content of the wire enamels is advantageously 20-60% by weight. Lower values are uneconomical, and, in the case of solids contents of more than 60% by weight, the processibility of the wire enamels is adversely affected owing to the high viscosity.

The invention also relates to processes for the preparation of the wire enamels. It is possible to prepare the binders of the wire enamels separately and then to dissolve them in methyl benzoate or isophorone or a mixture of methyl benzoate and isophorone.

The binder or binders is or are advantageously dissolved in a solvent mixture which, in addition to the alkyl-carboxylic acid ester and optionally isophorone, contains, as a further solvent, 2-phenoxyethanol in an amount of 10 to 50% by weight, based on the total solvent mixture.

Advantageously, however, the binders are prepared directly in methyl benzoate or isophorone or a mixture of methyl benzoate and isophorone.

If cresols are added in the final preparation stage of the polyester and polyesterimide resins, a part of the cresol enters the resin solution, i.e. enters the wire enamel. If, therefore, the enamel in any case contains cresol, there would be no point in using a cresol-free mixture of solvents and diluents. According to the invention, however, isophorone is advantageously used in the final preparation stage instead of cresol. Methyl benzoate is not suitable in every case here because, under certain circumstances, it can react with other components of the polyester or polyesterimide resin by transesterification.

It was found that isophorone not only reduces the viscosity of the reaction mixture and facilitates the azeotropic elimination of the condensation water but also washes out the substances which are crystallized out as a result of the sublimation in the upper parts of the apparatus and rapidly recycles them into the reaction mixture.

The invention is explained in more detail with reference to the following working examples:

EXAMPLE 1

250 g of 4,4'-diisocyanatodiphenylmethane, 380 g of the polyesteralcohol obtained from adipic acid, terephthalic acid, ethylene glycol and glycerol and 1 g of dibutyltin dilaurate are dissolved in 631 g of isophorone and reacted at 140° C. with stirring. A 50% strength solution of the polyurethane resin in isophorone forms. Thereafter, blocked isocyanate, as a crosslinking agent, and a catalyst are added and are homogeneously mixed in the polyurethane/isophorone solution.

EXAMPLE 2

By condensing 120 g of ethylene glycol, 166 g of terephthalic acid, 32.6 g of tris(2-hydroxyethyl)isocyanurate and 1 g of zinc acetate together at a temperature of 200° C., a polyester precursor is prepared. After at least 80% by weight of the theoretical amount of condensation water has been distilled off, 50 g of isophorone are added and the condensation is continued at 220° C. Isophorone distills off together with condensation water. A part of the added isophorone remains in the condensate.

The binder or binders is or are advantageously prepared in a solvent mixture which, in addition to the alkyl-carboxylic acid ester and optionally isophorone, contains 2-phenoxyethanol as a further solvent in an amount of 10 to 50% by weight, based on the total solvent mixture.

A further 50 g of isophorone are added to the polyester resin obtained, which contains 10% by weight of isophorone. 15 g of phenol resin and 17.5 g of tetrabutyl orthotitanate are then added. The solution is diluted with 350 g of cyclohexanone, 350 g of dimethyl glutarate and 200 g of solvent naphtha.

EXAMPLE 3

By condensing and imidizing a mixture of 80 g of ethylene glycol, 130 g of terephthalic acid, 200 g of tris(2-hydroxyethyl)isocyanurate, 250 g of trimellitic anhydride, 125 g of 4,4'-diaminodiphenylmethane, 100 g of bisphenol A, 1.4 g of zinc acetate together at 220° C. with elimination of water and of methanol, a polyesterimide precursor is obtained. After about 80% by weight of the theoretical amount of water and of methanol have been distilled off, 50 g of isophorone are added and the reaction is continued at 220° C. Isophorone distills off partially with water and methanol. A part of the added isophorone remains in the reaction product.

50 g of isophorone are added to the polyesterimide resin obtained, which contains 6% by weight of isophorone. Furthermore, 25 g of phenol resin and 30 g of tetrabutyl orthotitanate are added. The solution is diluted with 600 g of cyclohexanone, 300 g of solvent naphtha and 300 g of methyl benzoate.

EXAMPLE 4

400 g of a polyesterimide resin synthesized from ethylene glycol, neopentylglycol, 2-butyl-2-ethyl-1,3-propanediol, terephthalic acid, tris(2-hydroxyethyl)isocyanurate, trimellitic anhydride, 4,4'-diaminodiphenylmethane and bisphenol A with addition of zinc acetate are dissolved in 300 g of methyl benzoate, 50 g of isophorone, 50 g of dimethyl succinate, 100 g of cyclohexanone and 100 g of solvent naphtha. 15 g of phenol resin and 12 g of tetrabutyl orthotitanate are added and are mixed in homogeneously.

EXAMPLE 5

400 g of polyesterimide resin, synthesized from the starting materials stated in example 4, are dissolved in 200 g of methyl benzoate, 36 g of isophorone, 120 g of dimethyl adipate, 100 g of cyclohexanone, 26 g of methyldiglycol acetate and 44 g of Solvesso 100, after which 10 g of phenol resin and 12 g of tetrabutyl orthotitanate are added.

EXAMPLE 6

142 g of ethylene glycol, 184 g of tris(2-hydroxyethyl) isocyanurate and 175 g of dimethyl terephthalate in the presence of 0.2 g of zinc acetate and 0.2 g of tetrabutyl orthotitanate were transesterified at temperatures of up to 210° C. and at the same time 57 g of methanol were distilled off.

230 g of trimellitic anhydride and 119 g of 4,4'-diaminodiphenylmethane were then added continuously at 180-190° C. in a period of 30-60 minutes. The esterification of the resulting diimidodicarboxylic acid to an acid number of <5 with elimination of 43 g of water of reaction is then carried out at 200-220° C. After dilution with 250 g of methyl benzoate, 1000 g of a 75% strength polyesterimide solution were obtained.

EXAMPLE 7

500 g of the polyesterimide resin from example 6 were diluted with 26 g of methyl benzoate, 225 g of cyclohexanone and 75 g of solvent naphtha and homogeneously mixed with 20 g of phenol resin and 15 g of tetrabutyl orthotitanate.

The enamel had a solids content (1 g/1 h/180° C.) of 36% and a viscosity of 340 mPa·s at 23° C.

Enameling results (applied to 0.8 mm copper wire)

| | |
|---|---|
| Diameter increase according to DIN EN 60851-2: | 62 μm |
| Flexibility (0.8 mm) according to DIN EN 60851-3: | 30% |
| Hot penetration test according to DIN EN 60851-6: | 420° C. |
| Heat shock (0.5 h/220° C.) according to DIN EN 60851-6: | satisfactory |
| Tan δ slope: | 203° C. |
| Peel test: | 195 U |

EXAMPLE 8

500 g of the polyesterimide resin from example 6 were diluted with 100 g of methyl benzoate, 150 g of cyclohexanone and 75 g of solvent naphtha and homogeneously mixed with 20 g of phenol resin and 15 g of tetrabutyl orthotitanate.

The enamel had a solids content (1 g/1 h/180° C.) of 36.2% and a viscosity of 340 mPa·s at 23° C.

Enameling results (applied to 0.8 mm copper wire)

| | |
|---|---|
| Diameter increase according to DIN EN 60851-2: | 70 μm |
| Flexibility (0.8 mm) according to DIN EN 60851-3: | 30% |
| Hot penetration test according to DIN EN 60851-6: | 420° C. |
| Heat shock (0.5 h/220° C.) according to DIN EN 60851-6: | satisfactory |
| Tan δ slope: | 198° C. |
| Peel test: | 205 U |

EXAMPLE 9

500 g of the polyesterimide from example 6 were diluted with 137 g of methyl benzoate, 113 g of cyclohexanone and 75 g of solvent naphtha and homogeneously mixed with 20 g of phenol resin and 15 g of tetrabutyl orthotitanate.

The enamel had a solids content (1 g/1 h/180° C.) of 36.9% and a viscosity of 540 mPa·s at 23° C.

Enameling results (applied to 0.8 mm copper wire)

| | |
|---|---|
| Diameter increase according to DIN EN 60851-2: | 62 μm |
| Flexibility (0.8 mm) according to DIN EN 60851-3: | 30% |
| Hot penetration test according to DIN EN 60851-6: | 420° C. |
| Heat shock (0.5 h/220° C.) according to DIN EN 60851-6: | satisfactory |
| Tan δ slope: | 203° C. |
| Peel test: | 195 U |

EXAMPLE 10

500 g of the polyesterimide resin from example 6 were diluted with 175 g of methyl benzoate, 77 g of cyclohexanone and 75 g of solvent naphtha and homogeneously mixed with 20 g of phenol resin and 15 g of tetrabutyl orthotitanate.

The enamel had a solids content (1 g/1 h/180° C.) of 36.5% and a viscosity of 390 mPa·s at 23° C.

Enameling results (applied to 0.8 mm copper wire)

| | |
|---|---|
| Diameter increase according to DIN EN 60851-2: | 66 μm |
| Flexibility (0.8 mm) according to DIN EN 60851-3: | 30% |
| Hot penetration test according to DIN EN 60851-6: | 420° C. |
| Heat shock (0.5 h/220° C.) according to DIN EN 60851-6: | satisfactory |
| Tan δ slope: | 197° C. |
| Peel test: | 215 U |

The enamels prepared in examples 7 to 10 were applied on a standard wire enameling machine.

Enameling conditions:

| | |
|---|---|
| Oven: | MAG HE 4 |
| Temperature: | 590° C. |
| Application system: | Nozzles |
| Wire diameter: | 0.80 mm |
| Number of passes: | 11 |
| Increase: | 2 L |
| Take-off speed: | 40 m/min |

EXAMPLE 11

142 g of ethylene glycol, 184 g of tris(2-hydroxyethyl)isocyanurate and 175 g of dimethyl terephthalate in the presence of 0.2 g of zinc acetate and 0.2 g of tetrabutyl orthotitanate were transesterified at temperatures up to 210° C. and at the same time 57 g of methanol were distilled off.

230 g of trimellitic anhydride and 119 g of 4,4'-diaminodiphenylmethane were then added continuously at 180-190° C. in a period of 30-60 minutes. At 200-220° C., the esterification of the resulting diimidodicarboxylic acid is then carried out up to an acid number of <5 with elimination of 43 g of water of reaction. After dilution with 250 g of phenoxyethanol, 1000 g of a 75% strength polyesterimide solution were obtained.

EXAMPLE 12

500 g of the polyesterimide resin from example 11 were diluted with 87 g of methyl benzoate, 87 g of cyclohexanone, 167 g of phenoxyethanol and 107 g of solvent naphtha and homogeneously mixed with 20 g of phenol resin, 20 g of dimethyl phthalate and 10 g of tetrabutyl orthotitanate.

The enamel had a solids content (1 g/1 h/180° C.) of 39.2% and a viscosity of 1370 mPa·s at 23° C.

Enameling results (applied to 0.8 mm copper wire)

| | |
|---|---|
| Diameter increase according to DIN EN 60851-2: | 70 μm |
| Flexibility (0.8 mm) according to DIN EN 60851-3: | 25% |
| Hot penetration test according to DIN EN 60851-6: | 375° C. |
| Heat shock (0.5 h/220° C.) according to DIN EN 60851-6: | satisfactory |
| Tan δ slope: | 199° C. |

EXAMPLE 13

500 g of the polyesterimide resin from example 11 were diluted with 126 g of methyl benzoate, 126 g of di-basic ester, 122 g of phenoxyethanol and 77 g of solvent naphtha and homogeneously mixed with 20 g of phenol resin, 20 g of dimethyl phthalate and 10 g of tetrabutyl orthotitanate.

The enamel had a solids content (1 g/1 h/180° C.) of 37.0% and a viscosity of 550 mPa·s at 23° C.

Enameling results (applied to 0.8 mm copper wire)

| | |
|---|---|
| Diameter increase according to DIN EN 60851-2: | 68 μm |
| Flexibility (0.8 mm) according to DIN EN 60851-3: | 30% |
| Hot penetration test according to DIN EN 60851-6: | 405° C. |
| Heat shock (0.5 h/220° C.) according to DIN EN 60851-6: | satisfactory |
| Tan δ slope: | 186° C. |

EXAMPLE 14

500 g of the polyesterimide resin from example 11 were diluted with 87 g of methyl benzoate, 87 g of cyclohexanone, 27 g of phenoxyethanol, 145 g of ethyldiglycol and 107 g of solvent naphtha and homogeneously mixed with 20 g of phenol resin, 20 g of dimethyl phthalate and 10 g of tetrabutyl orthotitanate.

The enamel had a solids content (1 g/1 h/180° C.) of 38.6% and a viscosity of 690 mPa·s at 23° C.

Enameling results (applied to 0.8 mm copper wire)

| | |
|---|---|
| Diameter increase according to DIN EN 60851-2: | 63 μm |
| Flexibility (0.8 mm) according to DIN EN 60851-3: | 30% |
| Hot penetration test according to DIN EN 60851-6: | 400° C. |
| Heat shock (0.5 h/220° C.) according to DIN EN 60851-6: | satisfactory |
| Tan δ slope: | 195° C. |

EXAMPLE 15

500 g of the polyesterimide resin from example 11 were diluted with 152 g of methyl benzoate, 150 g of ethyldiglycol, 40 g of phenoxyethanol and 110 g of solvent naphtha and homogeneously mixed with 20 g of phenol resin, 20 g of dimethyl phthalate and 10 g of tetrabutyl orthotitanate.

The enamel had a solids content (1 g/1 h/180° C.) of 39.0% and a viscosity of 710 mPa·s at 23° C.

Enameling results (applied to 0.8 mm copper wire)

| | |
|---|---|
| Diameter increase according to DIN EN 60851-2: | 72 μm |

-continued

| | |
|---|---|
| Flexibility (0.8 mm) according to DIN EN 60851-3: | 25% |
| Hot penetration test according to DIN EN 60851-6: | 405° C. |
| Heat shock (0.5 h/220° C.) according to DIN EN 60851-6: | satisfactory |
| Tan δ slope: | 186° C. |

EXAMPLE 16

500 g of the polyesterimide resin from example 11 were diluted with 87 g of methyl benzoate, 87 g of cyclohexanone, 167 g of phenoxyethanol and 107 g of solvent naphtha and homogeneously mixed with 20 g of phenol resin, 20 g of dimethyl phthalate and 10 g of tetrabutyl orthotitanate.

The enamel had a solids content (1 g/1 h/180° C.) of 39.6% and a viscosity of 1050 mPa·s at 23° C.

Enameling results (applied to 0.8 mm copper wire)

| | |
|---|---|
| Diameter increase according to DIN EN 60851-2: | 70 μm |
| Flexibility (0.8 mm) according to DIN EN 60851-3: | 30% |
| Hot penetration test according to DIN EN 60851-6: | 395° C. |
| Heat shock (0.5 h/220° C.) according to DIN EN 60851-6: | satisfactory |
| Tan δ slope: | 183° C. |

EXAMPLE 17

500 g of the polyesterimide resin from example 11 were diluted with 87 g of methyl benzoate, 87 g of cyclohexanone, 167 g of phenoxyethanol and 107 g of solvent naphtha and homogeneously mixed with 4 g of phenol resin, 4 g of Phenodur PR 612, 20 g of dimethyl phthalate, 5 g of titanium acetylacetonate and 8 g of cresyl titanate.

The enamel had a solids content (1 g/1 h/180° C.) of 39.5% and a viscosity of 1000 mPa·s at 23° C.

Enameling results (applied to 0.8 mm copper wire)

| | |
|---|---|
| Diameter increase according to DIN EN 60851-2: | 68 μm |
| Flexibility (0.8 mm) according to DIN EN 60851-3: | 25% |
| Hot penetration test according to DIN EN 60851-6: | 390° C. |
| Heat shock (0.5 h/220° C.) according to DIN EN 60851-6: | satisfactory |
| Tan δ slope: | 197° C. |

EXAMPLE 18

500 g of the polyesterimide resin from example 11 were diluted with 87 g of methyl benzoate, 87 g of cyclohexanone, 167 g of phenoxyethanol and 107 g of solvent naphtha and homogeneously mixed with 5 g of Phenodur PR 612, 20 g of dimethyl phthalate and 5 g of titanium acetylacetonate and 8 g of cresyl titanate.

The enamel had a solids content (1 g/1 h/180° C.) of 39.7% and a viscosity of 1120 mPa·s at 23° C.

Enameling results (applied to 0.8 mm copper wire)

| | |
|---|---|
| Diameter increase according to DIN EN 60851-2: | 70 μm |
| Flexibility (0.8 mm) according to DIN EN 60851-3: | 25% |
| Hot penetration test according to DIN EN 60851-6: | 390° C. |
| Heat shock (0.5 h/220° C.) according to DIN EN 60851-6: | satisfactory |
| Tan δ slope: | 204° C. |

EXAMPLE 19

500 g of the polyesterimide resin from example 11 were diluted with 87 g of methyl benzoate, 87 g of cyclohexanone, 167 g of phenoxyethanol and 107 g of solvent naphtha and homogeneously mixed with 5 g of Phenodur PR 612, 20 g of dimethyl phthalate and 11 g of titanium acetylacetonate.

The enamel had a solids content (1 g/1 h/180° C.) of 39.6% and a viscosity of 935 mPa·s at 23° C.

Enameling results (applied to 0.8 mm copper wire)

| | |
|---|---|
| Diameter increase according to DIN EN 60851-2: | 72 μm |
| Flexibility (0.8 mm) according to DIN EN 60851-3: | 25% |
| Hot penetration test according to DIN EN 60851-6: | 385° C. |
| Heat shock (0.5 h/220° C.) according to DIN EN 60851-6: | satisfactory |
| Tan δ slope: | 192° C. |

The enamels prepared in examples 12 to 19 were applied on a standard wire enameling machine.

Enameling conditions:

| | |
|---|---|
| Oven: | MAG HE 4 |
| Temperature: | 590° C. |
| Application system: | Nozzles |
| Wire diameter: | 0.80 mm |
| Number of passes: | 11 |
| Increase: | 2 L |
| Take-off speed: | 40 m/min |

All publications, patents, and patent documents cited in the specification are incorporated by reference herein, as though individually incorporated by reference. In the case of any inconsistencies, the present disclosure, including any definitions therein will prevail.

The invention has been described with reference to various specific and preferred embodiments and techniques. However, it should be understood that many variations and modifications may be made while remaining within the spirit and scope of invention which is defined according to the claims appended hereto.

What is claimed is:

1. A wire enamel comprising a binder and a diluent composition;
wherein the binder is a resin selected from the group consisting of a polyester, polyesterimide, polyamidoimide, polyurethane, and a mixture thereof;

wherein at least 50% by weight of the diluent composition comprises a mixture of an alkyl carboxylic acid ester having the general formula:

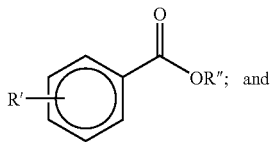

isophorone;
wherein R' is —$C_nH_{2n+1}$, substituted at the m- or p-position and n is 1 to 3; and R" is —$C_xH_{2x+1}$, where x is 1 to 10; or a cycloaliphatic radical of the general formula —$C_yH_{2y-1}$, where y is 5 to 10.

2. The wire enamel of claim 1 wherein R" is —$C_xH_{2x+1}$ and x is 1 to 3.

3. The wire enamel of claim 2 wherein x is 1.

4. The wire enamel of claim 1 wherein R" is a cycloaliphatic radical of the general formula —$C_yH_{2y-1}$ and y is 5-7.

5. The wire enamel of claim 4 wherein y is 6.

6. The wire enamel of claim 1 having a solids content of 20-60% by weight.

7. The wire enamel of claim 1 wherein the diluent composition further comprises 2-phenoxyethanol in an amount of 10 to 50% by weight, based on the total proportion of solvents and diluents.

8. A process for the preparation of wire enamels comprising a binder and a diluent composition; wherein the process comprises mixing the binder with the diluent composition;
wherein the binder is a resin selected from the group consisting of a polyester, polyamide, polyesterimide, polyurethane, and a mixture thereof;
wherein at least 50% by weight of the diluent composition comprises a mixture of an alkyl-carboxylic acid ester of the general formula

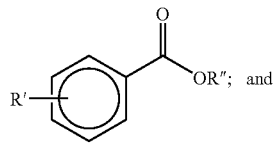

isophorone;
wherein R' is —$C_nH_{2n+1}$, substituted at the m- or p-position and n is 1 to 3; and R" is —$C_xH_{2x+1}$, where x is 1 to 10; or a cycloaliphatic radical of the general formula —$C_yH_{2y-1}$, where y is 5 to 10.

9. The process of claim 8 wherein the binder is selected from the group consisting of a polyester, polyesterimide, and a mixture thereof.

10. The process of claim 8 wherein the binder is dissolved in the diluent composition.

11. The process of claim 8 wherein R" is —$C_xH_{2x+1}$ and x is 1 to 3.

12. The process of claim 11 wherein x is 1.

13. The process of claim 8 wherein R" is a cycloaliphatic radical of the general formula —$C_yH_{2y-1}$ and y is 5-7.

14. The process of claim 13 wherein y is 6.

15. The process of claim 8 wherein the diluent composition further comprises 2-phenoxyethanol in an amount of 10 to 50% by weight, based on the total proportion of solvents and diluents.

16. The process of claim 10 wherein the diluent composition further comprises 2-phenoxyethanol in an amount of 10 to 50% by weight, based on the total proportion of solvents and diluents.

* * * * *